(12) United States Patent
Miyazawa et al.

(10) Patent No.: US 8,558,806 B2
(45) Date of Patent: Oct. 15, 2013

(54) INFORMATION PROCESSING APPARATUS, INFORMATION PROCESSING METHOD, AND PROGRAM

(75) Inventors: Yusuke Miyazawa, Tokyo (JP); Fuminori Homma, Tokyo (JP)

(73) Assignee: Sony Corporation, Tokyo (JP)

(*) Notice: Subject to any disclaimer, the term of this patent is extended or adjusted under 35 U.S.C. 154(b) by 316 days.

(21) Appl. No.: 12/969,262

(22) Filed: Dec. 15, 2010

(65) Prior Publication Data

US 2011/0157045 A1 Jun. 30, 2011

(30) Foreign Application Priority Data

Dec. 25, 2009 (JP) ................................ P2009-295585

(51) Int. Cl.
*G06F 3/041* (2006.01)
(52) U.S. Cl.
USPC .......................................... 345/173; 345/156
(58) Field of Classification Search
USPC ......... 345/173–178; 178/18.01–18.09, 18.11; 715/700, 764
See application file for complete search history.

(56) References Cited

U.S. PATENT DOCUMENTS

| | | | | |
|---|---|---|---|---|
| 2008/0136785 | A1* | 6/2008 | Baudisch et al. | 345/173 |
| 2009/0122007 | A1* | 5/2009 | Tsuzaki et al. | 345/156 |
| 2009/0193361 | A1* | 7/2009 | Lee et al. | 715/810 |
| 2010/0095773 | A1* | 4/2010 | Shaw et al. | 73/514.31 |
| 2010/0169834 | A1* | 7/2010 | Wakizaka et al. | 715/821 |

FOREIGN PATENT DOCUMENTS

| | | |
|---|---|---|
| JP | 2004-54854 | 2/2004 |
| JP | 2009-116583 | 5/2009 |

* cited by examiner

*Primary Examiner* — Stephen Sherman
(74) *Attorney, Agent, or Firm* — Sherr & Jiang, PLLC

(57) ABSTRACT

An information processing apparatus includes a detector configured to detect an operation body approaching a display screen, a determination unit configured to determine whether or not the operation body detected by the detector approaches a first region of the display screen, a display controller configured to display display content included in the first region in a second region that is different from the first region when the operation body is determined by the determination unit to be approaching the first region, and an operation controller configured to regard an operation performed by the operation body in the first region as an operation for the display content displayed in the second region by the display controller.

19 Claims, 13 Drawing Sheets

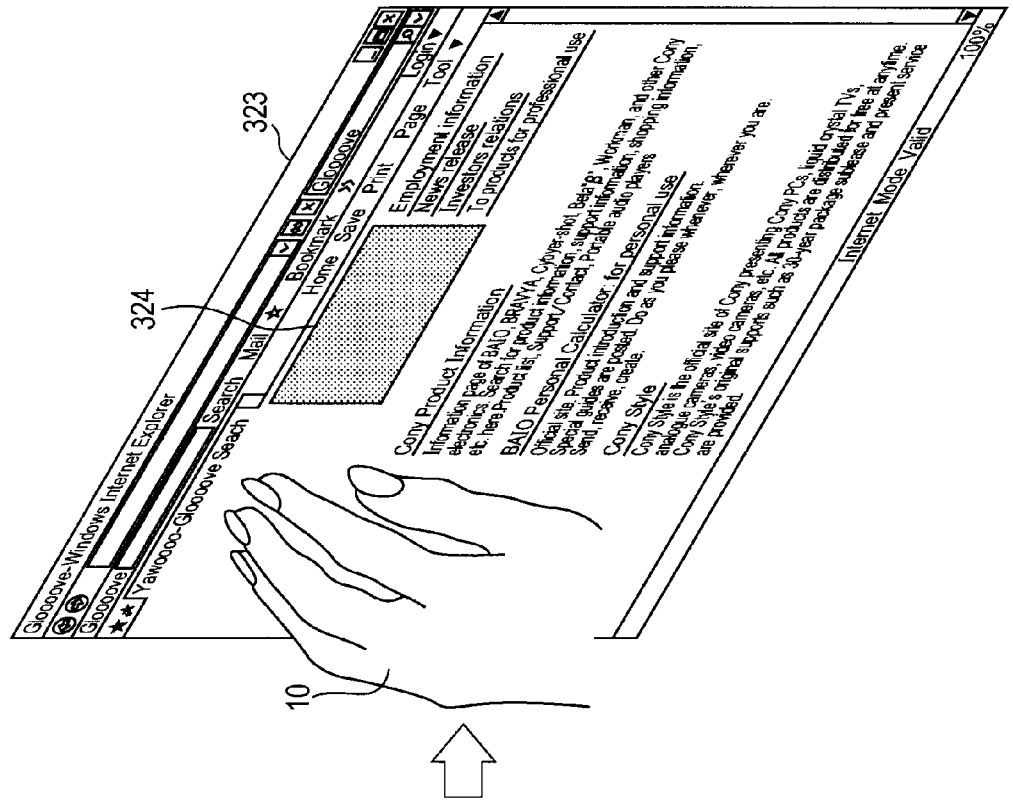
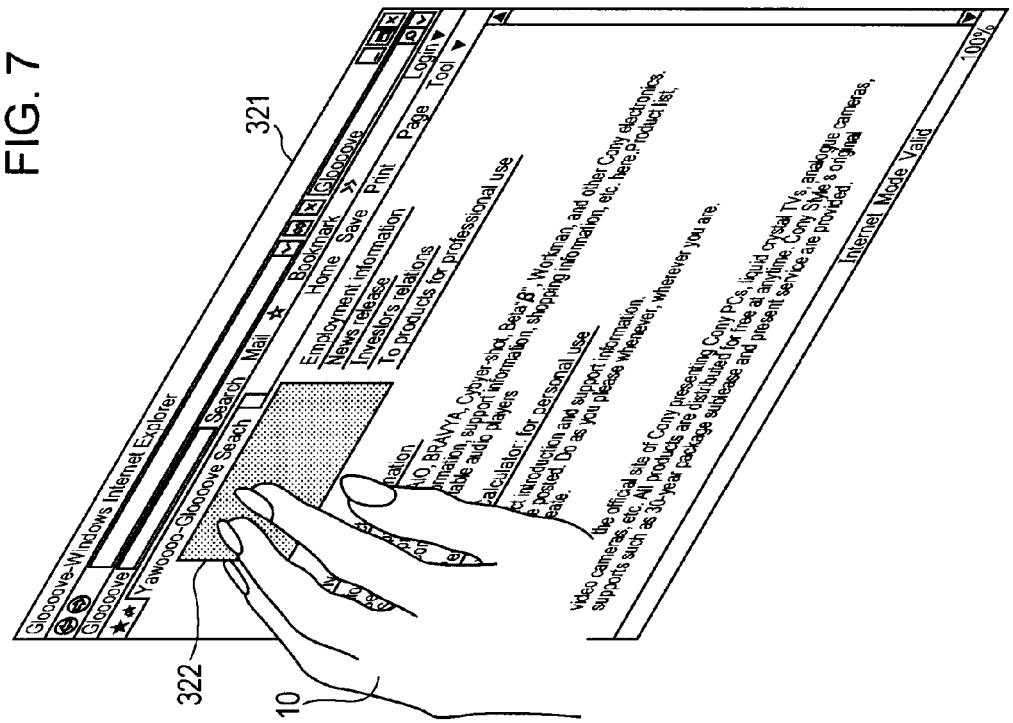
FIG. 7

FIG. 9
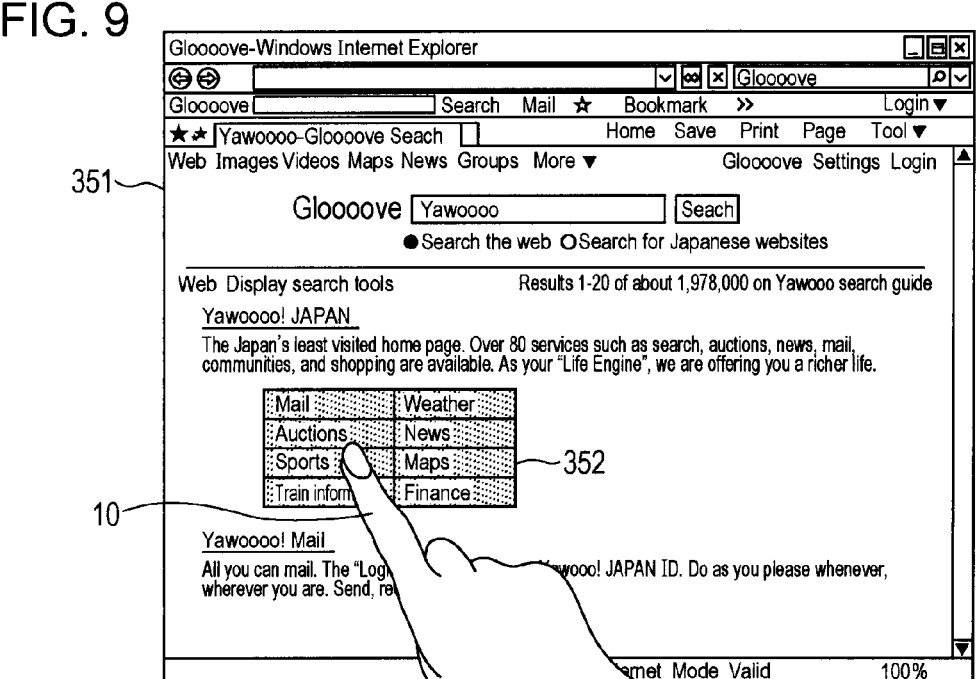
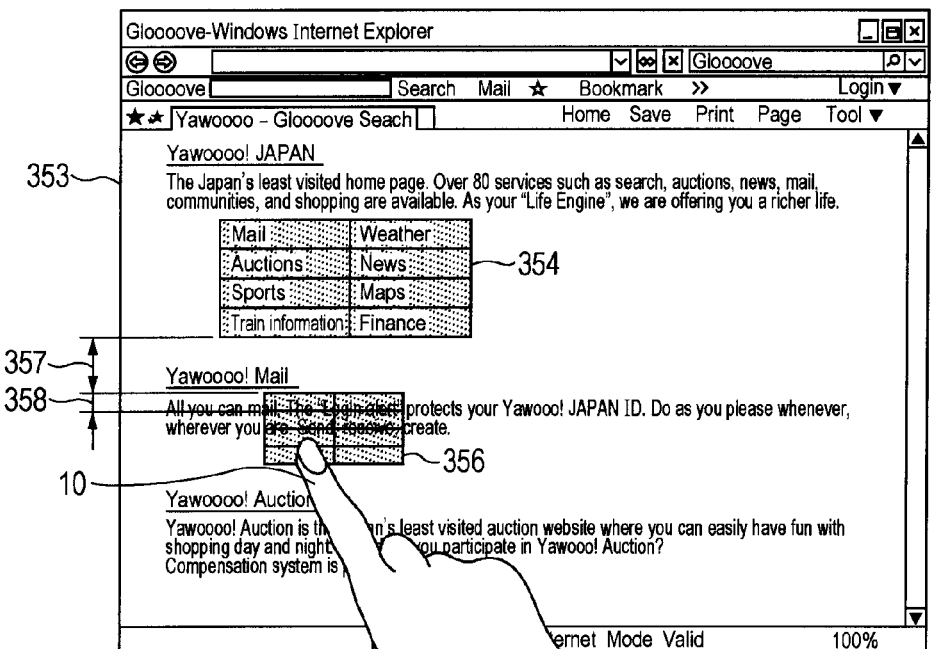

INFORMATION PROCESSING APPARATUS, INFORMATION PROCESSING METHOD, AND PROGRAM

BACKGROUND OF THE INVENTION

1. Field of the Invention

The present invention relates to information processing apparatuses, information processing methods, and programs and more particularly to an information processing apparatus, an information processing method, and a program that detect an approach of an operation body to a display screen in order to control the display of the display screen.

2. Description of the Related Art

In recent years, it has become physically possible for liquid crystal displays (hereinafter referred to as LCDs) to display small letters and icons due to the improvement of the definition thereof, which has markedly increased the amount of information that can be displayed on a display area. In addition, mobile devices having touch panels for realizing intuitive operability and maximizing the display area the mobile devices are gaining in popularity.

In the case of operation using a touch panel, since a display item is selected by touching a display screen, it is necessary for icons and buttons to be displayed to have certain sizes. When the amount of information that can be displayed on the display area is increased by the improvement of the definition of LCDs as described above, if selectable items are displayed close to each other, the operability is significantly degraded, even if the sizes of letters are large enough to be read. Thus, there has been a problem in that the advantages of high-definition LCDs may not be utilized due to the physical sizes of letters necessary for touch operation.

To tackle this problem, a technique in which input items are collectively displayed in a selected region in order to make a selection operation easier is disclosed (Japanese Unexamined Patent Application Publication No. 2004-54854). In addition, another technique in which an item nearest to the coordinates of an approaching finger is enlarged or subjected to focus display in order to reduce operation mistakes is also disclosed (Japanese Unexamined Patent Application Publication No. 2009-116583).

SUMMARY OF THE INVENTION

In the above-mentioned Japanese Unexamined Patent Application Publication No. 2004-54854, however, although the selection operation is easier because of the collectively displayed input items as shown in FIG. 12, there has been a problem in that a user has to look for an item to be selected again from an input item list, which is troublesome. In the case of the above-mentioned Japanese Unexamined Patent Application Publication No. 2009-116583, although an item nearest to the coordinates of an approaching finger is enlarged or subjected to the focus display as shown in FIGS. 13A and 13B, there has been a problem in that it is difficult to see the item that has been enlarged or subjected to the focus display because the item, which is naturally located directly below the finger, is hidden behind the finger.

In view of the above problems, it is desirable to provide an information processing apparatus, an information processing method, and a program that are novel and improved and with which an operation target displayed close to other operation targets can be easily selected while the display area is effectively utilized.

According to an embodiment of the present invention, there is provided an information processing apparatus including a detector configured to detect an operation body approaching a display screen, a determination unit configured to determine whether or not the operation body detected by the detector approaches a first region of the display screen, a display controller configured to display display content included in the first region in a second region that is different from the first region when the operation body is determined by the determination unit to be approaching the first region, and an operation controller configured to regard an operation of the operation body in the first region as an operation for the display content displayed in the second region by the display controller.

In addition, the display controller may display the display content included in the first region in the second region that is separated from a region approached by the operation body by a predetermined distance.

In addition, the determination unit may determine whether or not the operation body that has approached the first region of the display screen remains close to the first region for a predetermined period of time, and the display controller may display the display content included in the first region in the second region that is different from the first region when the operation body that has approached the first region is determined by the determination unit as remaining close to the first region for the predetermined period of time.

In addition, the display controller may define the second region as a region that is outside a region approached by the operation body and inside a display area of the display screen.

In addition, the display controller may execute focus display on the second region in which the display content included in the first region is displayed.

In addition, when a plurality of selection items are included in the display content displayed in the second region, the display controller may execute the focus display on a selection item selected in the operation for the display content displayed in the second region, the operation for the display content displayed in the second region being obtained by using the operation controller.

In addition, the display controller may enlarge the display content included in the first region and display the enlarged display content in the second region.

In addition, the operation controller may obtain the operation for the display content displayed in the second region by adding gain to an amount of movement of the operation body in the first region.

In addition, the operation controller may change the gain to be added to the amount of movement of the operation body in accordance with a display density of the display content displayed in the second region.

In addition, according to another embodiment of the present invention, there is provided an information processing method including the steps of detecting an operation body approaching a display screen, determining whether or not the operation body that has been detected approaches a first region of the display screen, displaying display content included in the first region in a second region that is different from the first region when the operation body is determined to be approaching the first region, and regarding an operation of the operation body in the first region as an operation for the display content displayed in the second region.

In addition, according to another embodiment of the present invention, there is provided a program for causing a computer to function as an information processing apparatus, the information processing apparatus including a detector configured to detect an operation body approaching a display screen, a determination unit configured to determine whether or not the operation body detected by the detector approaches a first region of the display screen, a display controller configured to display display content included in the first region in a second region that is different from the first region when the operation body is determined by the determination unit to be approaching the first region, and an operation controller configured to regard an operation of the operation body in the first region as an operation for the display content displayed in the second region by the display controller.

As described above, according to the embodiments of the present invention, an operation target displayed close to other operation targets can be easily selected while the display area is effectively utilized.

BRIEF DESCRIPTION OF THE DRAWINGS

FIG. 7 is an explanatory diagram illustrating another display example according to the embodiment;

FIG. 9 is an explanatory diagram illustrating a display example after offset display according to the embodiment;

DESCRIPTION OF THE PREFERRED EMBODIMENTS

Figure 1:
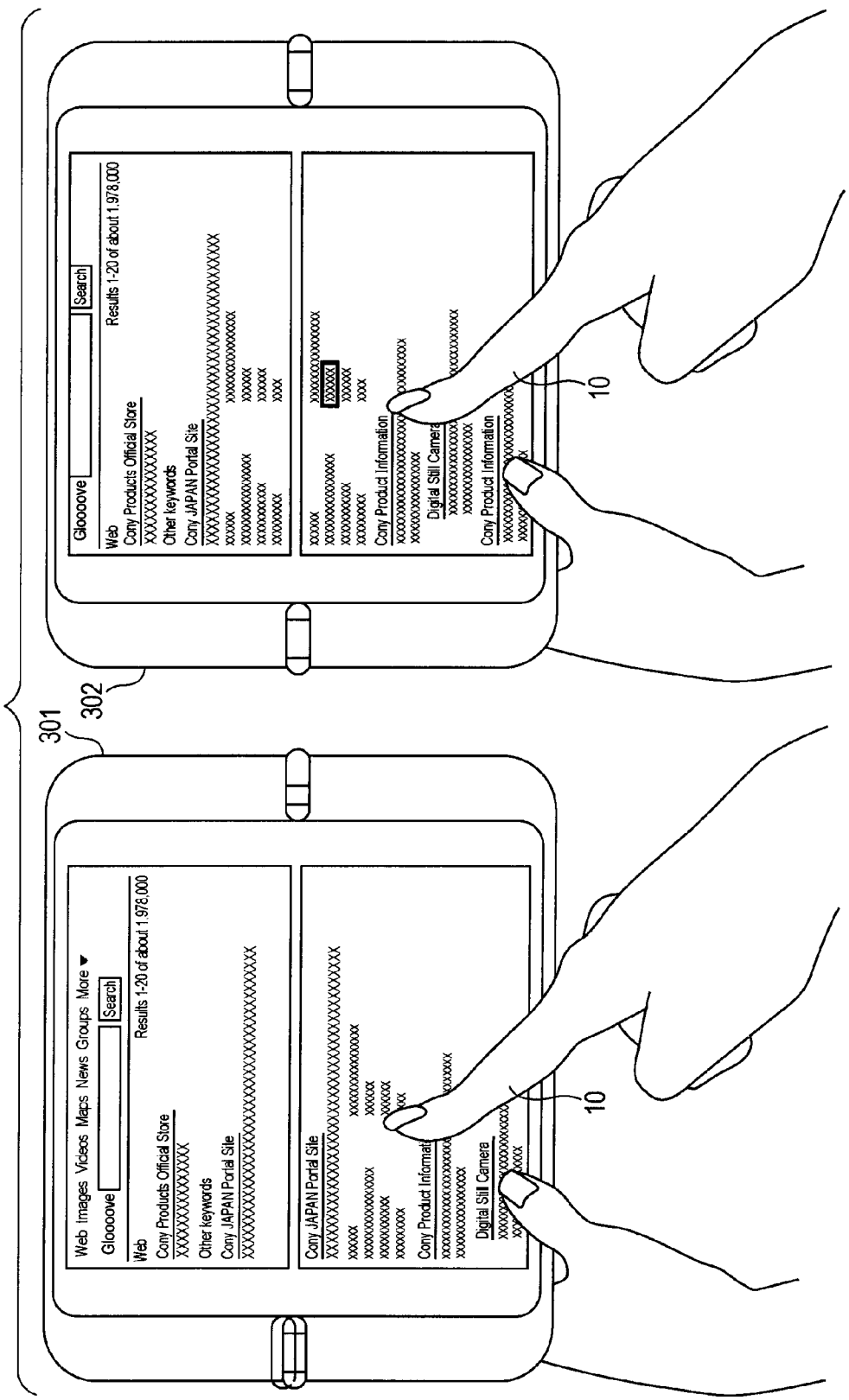
FIG. 1 is an explanatory diagram illustrating a display example according to an embodiment of the present invention.

Preferred embodiments of the present invention are described in detail hereinafter with reference to the accompanying drawings. In this specification and the drawings, components having substantially the same functional configuration are given the same reference numeral in order to eliminate redundant description thereof.

The preferred embodiments are described in the following order:
(1) Overview Of Embodiment
(2) Hardware Configuration Of Information Processing Apparatus
(3) Functional Configuration Of Information Processing Apparatus
(4) Details Of Operation Of Information Processing Apparatus (1) Overview Of Embodiment First, an overview of an embodiment of the present invention is described. In recent years, it has become physically possible for LCDs to display small letters and icons due to the improvement of the definition thereof, which has markedly increased the amount of information that can be displayed on a display area. In addition, mobile devices having touch panels for realizing intuitive operability and maximizing the display area of each device are gaining in popularity.

In the case of operation using a touch panel, since a display item is selected by touching a display screen, it is necessary for icons and buttons to be displayed to have certain sizes. When the amount of information that can be displayed on the display area is increased by the improvement of the definition of LCDs as described above, if selectable items are displayed close to each other, the operability is significantly degraded, even if the sizes of letters are large enough to be read. Thus, there has been a problem in that the advantages of high-definition LCDs may not be utilized due to the physical sizes of letters necessary for touch operation.

To tackle this problem, a technique in which input items are collectively displayed in a selected region in order to make a selection operation easier is disclosed. In addition, another technique in which an item nearest to the coordinates of an approaching finger is enlarged or subjected to focus display in order to reduce operation mistakes is also disclosed.

Figure 12:
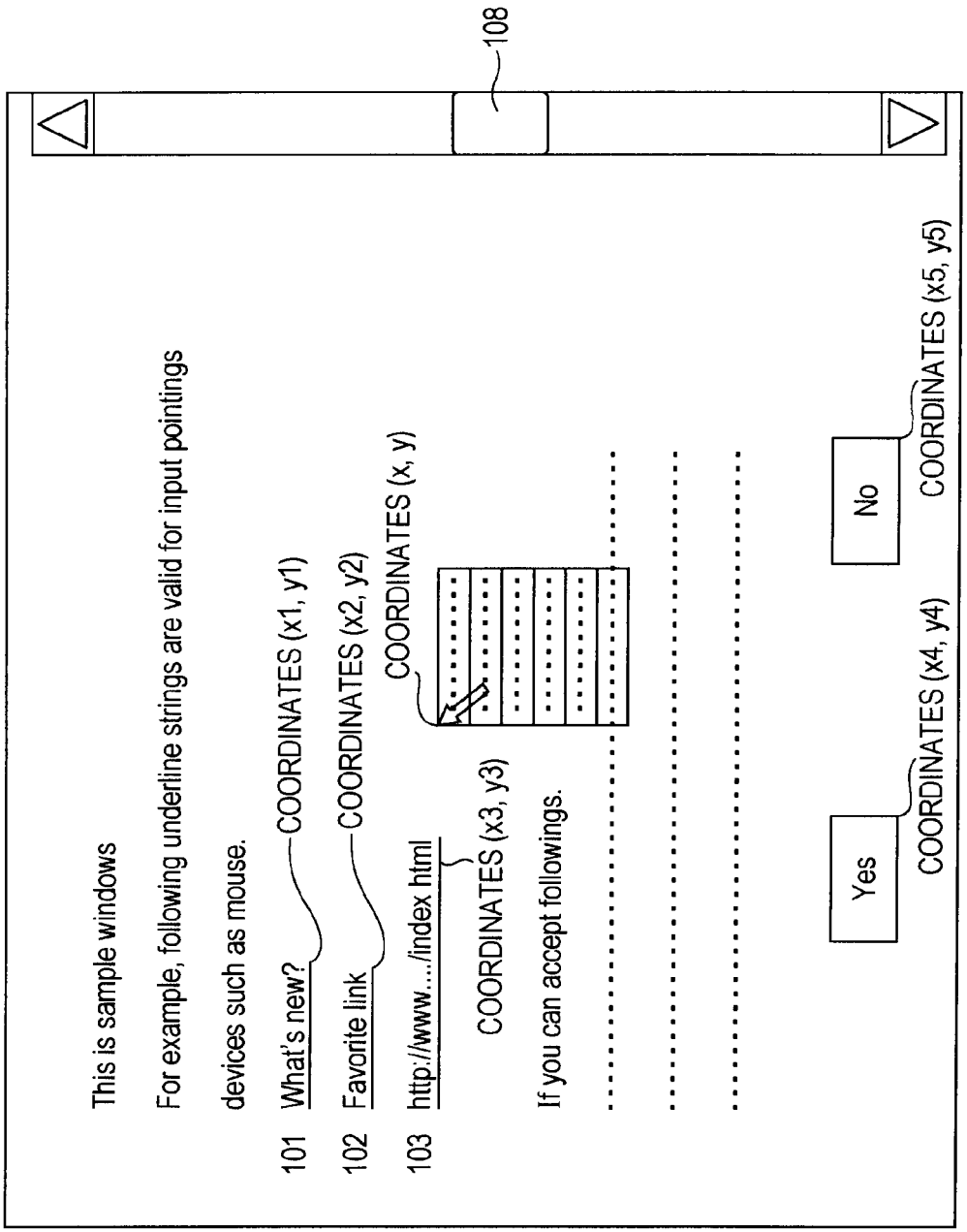
FIG. 12 is an explanatory diagram illustrating a display example according to the related art.
Figure 13A:
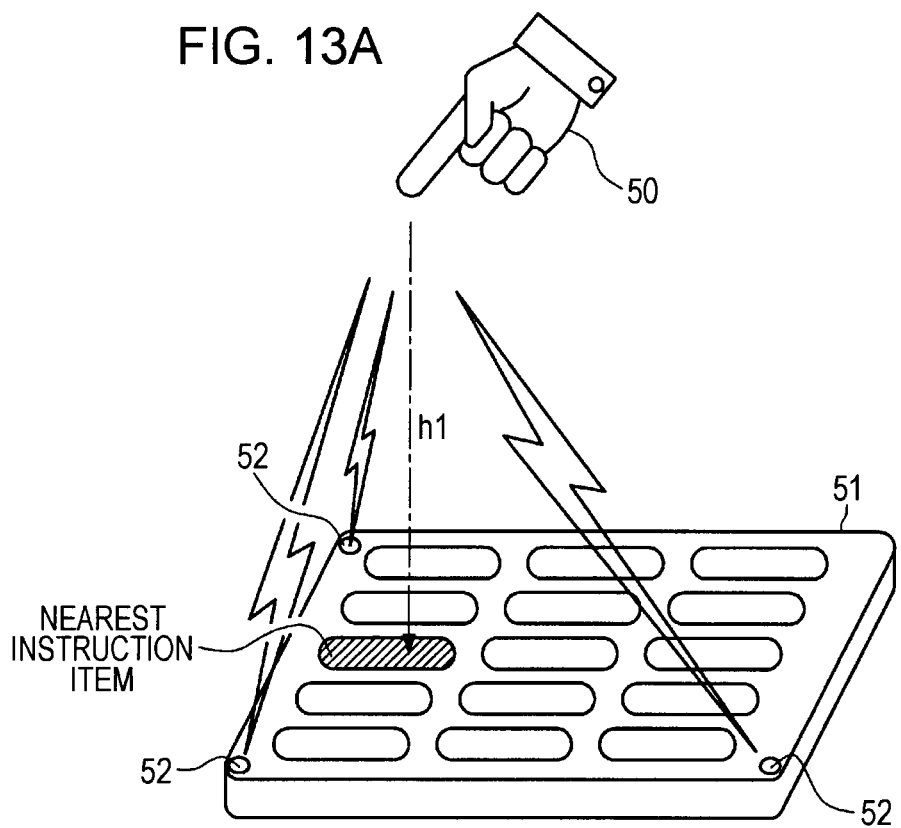
FIGS. 13A and 13B are explanatory diagrams illustrating another display example according to the related art.
Figure 13B:
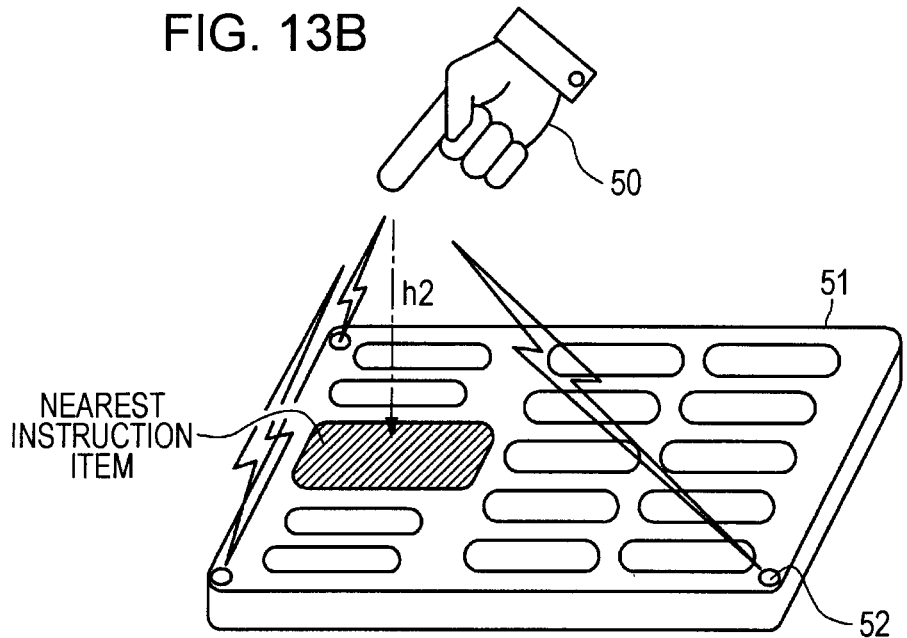

In the former technique, however, although the selection operation is easier because of the collectively displayed input items as shown in FIG. 12, there has been a problem in that a user has to look for the item to be selected again from an input item list, which is troublesome. In the case of the latter technique, although an item nearest to the coordinates of an approaching finger is enlarged or subjected to focus display as shown in FIGS. 13A and 13B, there has been a problem in that it is difficult to see the item that has been enlarged or subjected to the focus display because the item, which is naturally located directly below the finger, is hidden behind the finger.

In consideration of the above-described situations, an information processing apparatus 100 according to an embodiment of the present invention is provided. With the information processing apparatus 100 according to this embodiment, an operation target displayed close to other operation targets can be easily selected while the display area is effectively utilized. For example, in a display example 301 shown in FIG. 1, although a lot of information can be seen on a high-definition LCD, operation is difficult because selection targets are displayed close to each other.

Therefore, the user has to perform very delicate operation with an operation body 10, which tends to result in an operation mistake in which the user selects a target different from the one he/she wants to. This embodiment offers display of operation targets while providing a certain offset from the operation body 10 in order to make it easy to select an operation target displayed close to other operation targets while effectively utilizing the display area.

For example, when the operation body 10 approaches a region in the display example 301 in which operation targets are displayed close to each other and remains close to the region for more than a predetermined period of time, display content included in the region moves as shown in a display example 302. The operation targets are thus displayed with a certain offset from the operation body 10. To be displayed with a certain offset provided means that operation targets are displayed in a region different from a region that the operation body 10 actually approaches or touches and at a position separated from the operation body 10 by a certain distance.

In addition, a target corresponding to the position of the operation body 10 can be subjected to the focus display to enable the user to recognize the target being selected with the operation body 10. When the operation body 10 performs a touch operation during the focus display, the target that has been subjected to the focus display can be selected. The focus can be moved to another target by moving the operation body 10.

As has been seen, operation targets are displayed on the display screen of a touch panel with a certain offset from the operation body 10 when selection targets, input targets, or the like are displayed close to each other. The user can perform an operation while seeing an area around selection targets. In addition, because display content on the display screen does not change significantly even when the display with a certain offset provided is performed, it is easy to select an operation target displayed close to other operation targets while effectively utilizing the display area. Therefore, it is possible to improve the operability of the touch panel while maintaining the amount of information displayed on the display screen.

The information processing apparatus 100 according to this embodiment is described with reference to an example illustrated in FIG. 1, such as a compact audio player, a media player, a personal digital assistant (PDA), or a mobile phone; however, this embodiment is not limited to these examples and may be applied to a personal computer and the like. In addition, although configured as an apparatus integrated with a display unit such as a display herein, the information processing apparatus 100 according to this embodiment is not limited to this example and the information processing apparatus 100 and the display unit may be configured as separate devices.

(2) Hardware Configuration of Information Processing Apparatus

Figure 2:
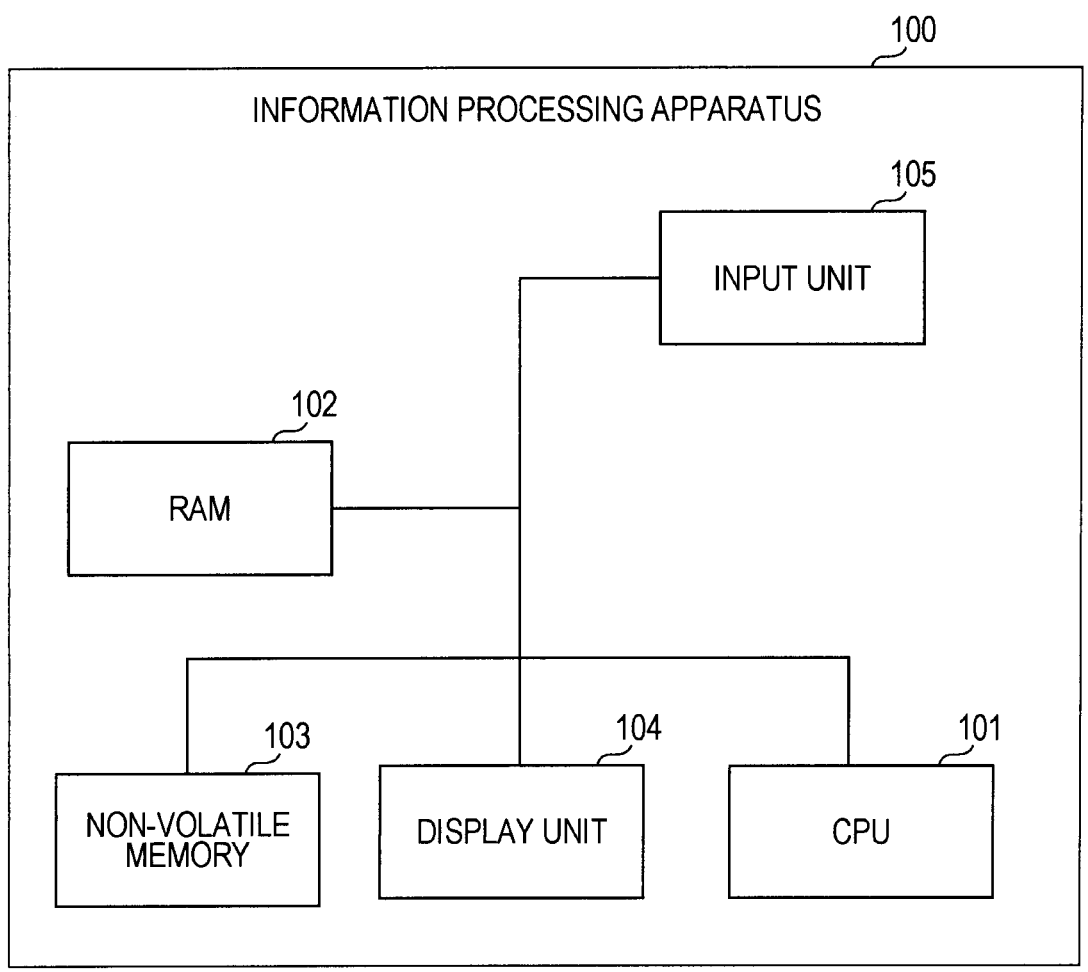
FIG. 2 is a block diagram illustrating the hardware configuration of an information processing apparatus according to the embodiment.

The overview of the present embodiment has been described above. Next, the hardware configuration of the information processing apparatus 100 according to the present embodiment is described with reference to FIG. 2. FIG. 2 is a block diagram illustrating the hardware configuration of the information processing apparatus 100.

The information processing apparatus 100 has a central processing unit (CPU) 101, a random access memory (RAM) 102, a non-volatile memory 103, a display unit 104, an input unit 105, and the like.

The CPU 101 functions as an arithmetic processing unit and a control unit and controls the overall operation of the information processing apparatus 100 in accordance with various programs. The CPU 101 may be a microprocessor instead. The RAM 102 temporarily stores programs used for execution by the CPU 101, parameters that change in accordance with the execution, and the like. The non-volatile memory 103 stores programs and calculation parameters used by the CPU 101, and the like. These components are connected to each other by a host bus (no reference numeral is given) including a CPU bus.

The display unit 104 is an example of an output unit included in the information processing apparatus 100. The display unit 104 is constituted by, for example, an LCD unit or the like and outputs results of various processes performed by the information processing apparatus 100. More specifically, the display unit 104 displays the results of various processes performed by the information processing apparatus 100 in the form of text or images.

The input unit 105 is constituted by, for example, input devices such as a mouse, a keyboard, a touch screen, a button, a microphone, a switch, a lever, and the like with which the user inputs information, an input control circuit that generates an input signal on the basis of input by the user and outputs the input signal to the CPU 101, and the like. The user of the information processing apparatus 100 can input various data to the information processing apparatus 100 and instruct the information processing apparatus 100 to perform a processing operation by operating the input unit 105.

In this embodiment, operation by the user is accepted mainly by detecting an operation body such as the user's finger or hand with the touch panel. The touch panel has two functions: display and input. The touch panel according to this embodiment detects the approach and touch of the user's hand or finger. When an approach is detected, the region approached is also detected. As a detection method, a resistance film type that uses thin metal films forming transparent electrodes, a capacitive sensing type that detects the position of a fingertip by sensing a change in the capacitance between the fingertip and a conductive film, an infrared radiation blocking type, an electromagnetic induction type, or any other type that can detect the positional information of the operation body on the display may be used.

Now, a case in which the operation body is detected by a capacitive touch panel is specifically described. The capacitive touch panel has capacitive sensors arranged in a lattice-like pattern and constantly changes the values thereof in accordance with the change in capacitance. When the operation body such as a finger approaches or touches the capacitive sensors, the capacitances detected by the capacitive sensors increase. The capacitance of each capacitive sensor can be simultaneously obtained. By simultaneously detecting changes in the capacitances of all the capacitive sensors and by performing interpolation, the shape of the finger approaching or touching the touch panel can be detected. The capacitive touch panel outputs the values of detected capacitances to the CPU 101.

Figure 3:
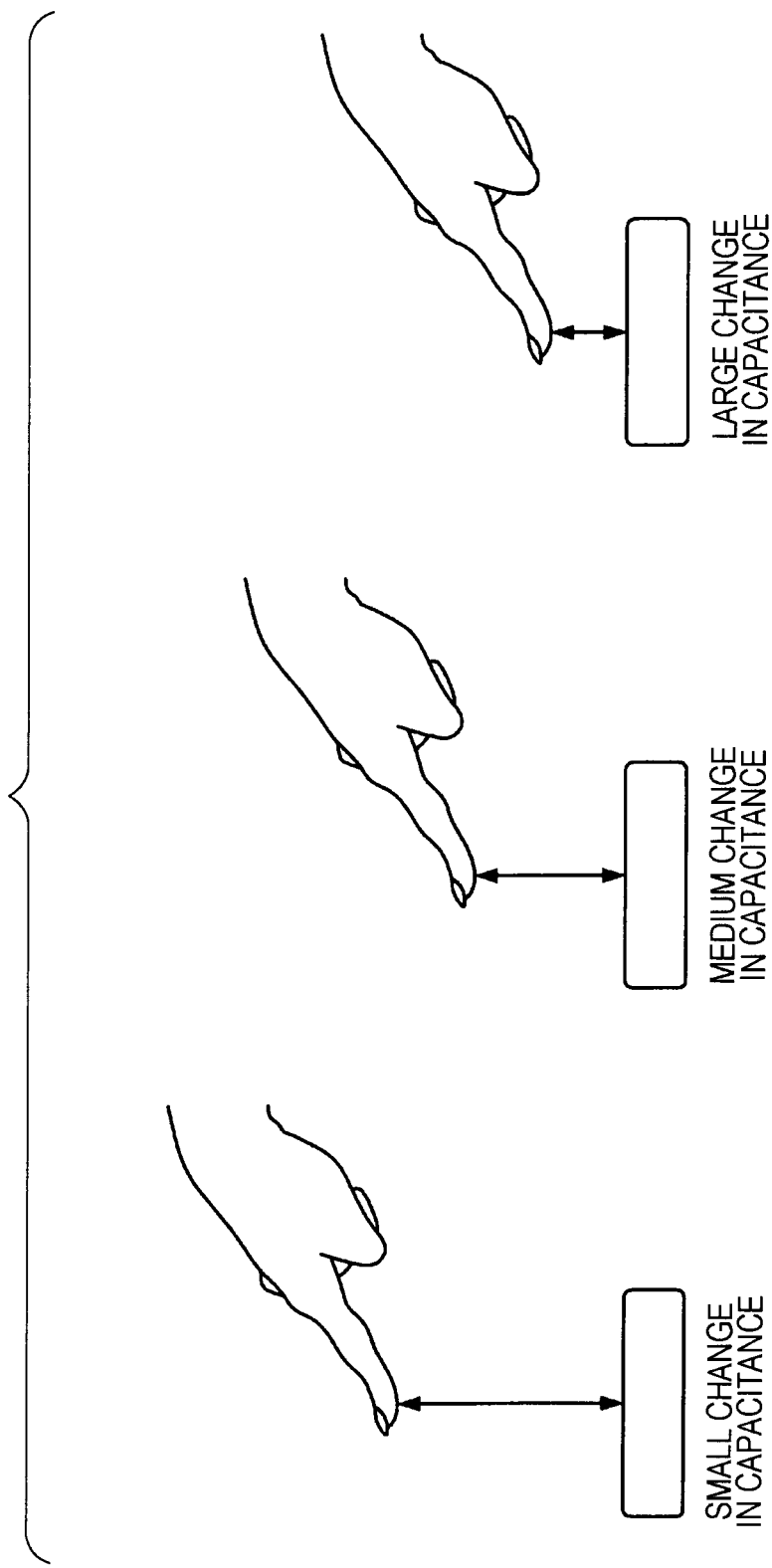
FIG. 3 is an explanatory diagram illustrating an approach operation and an approach region of an operation body according to the embodiment.
Figure 4:
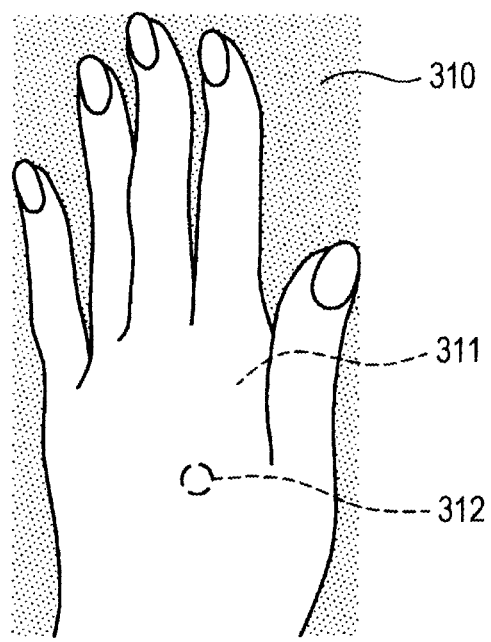
FIG. 4 is an explanatory diagram illustrating the approach operation and the approach region of the operation body according to the embodiment.

Next, an approach operation of the operation body and an approach region in this embodiment are described with reference to FIGS. 3 and 4. FIGS. 3 and 4 are explanatory diagrams illustrating the approach operation of the operation body and the approach region. In this embodiment, the operation body is regarded as performing the approach operation when the operation body approaches the touch panel and changes in the capacitances of the touch panel are in a predetermined range of values.

Suppose that the amount of change in capacitance changes from small to medium to large as illustrated in FIG. 3. When the amount of change in capacitance is smaller than a predetermined threshold (change in capacitance=small), the operation body is determined as neither approaching nor touching the touch panel. When the amount of change in capacitance is larger than another predetermined threshold (change in capacitance=large), the operation body is determined as touching the touch panel. When the amount of change in capacitance is in a predetermined range of values (change in capacitance=medium), the operation body is determined to be approaching the touch panel.

In addition, as illustrated in FIG. 4, upon the approach of the operation body to the touch panel, a region of the touch panel in which the amount of change in capacitance is larger than a predetermined value is called an approach detection region 311. The approach detection region 311 is also referred to as an approach area hereinafter. In addition, a center of gravity 312 of the approach area 311 is calculated and the movement of the center of gravity 312 is detected as the movement of the operation body during the approach operation. Thus, the direction of movement and the amount of movement (moving distance) of the operation body during the approach operation can be detected by detecting the movement of the center of gravity 312 of the approach area 311 as the movement of the operation body.

The hardware configuration of the information processing apparatus 100 according to this embodiment has been described. Each component described above may be formed of a general-purpose member or a piece of hardware specialized in the function thereof. Therefore, the hardware configuration to be used can be appropriately changed in accordance with the technological level employed for each occasion in which each embodiment is practically used.

(3) Functional Configuration of Information Processing Apparatus

Figure 5:
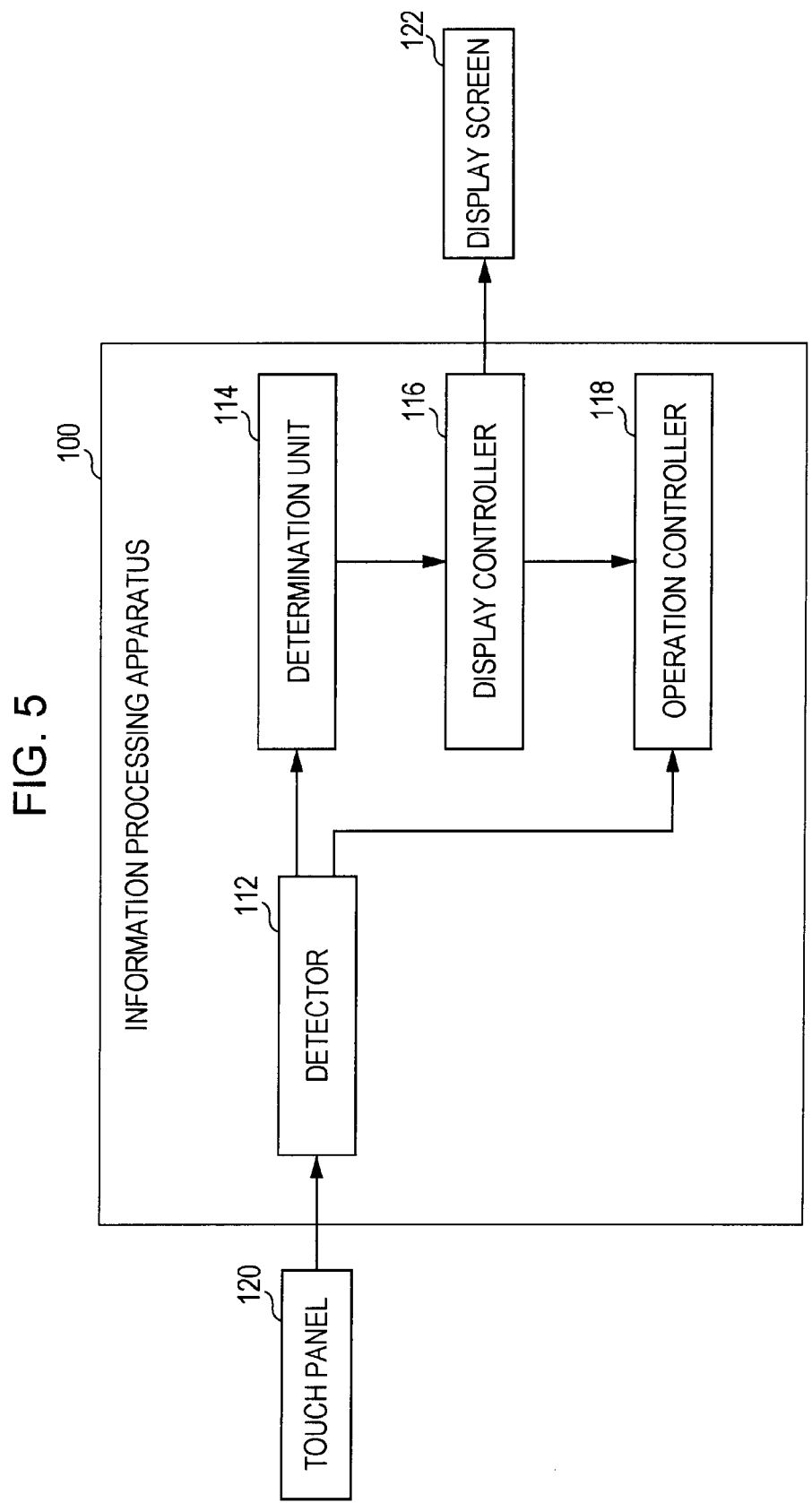
FIG. 5 is a block diagram illustrating the functional configuration of the information processing apparatus according to the embodiment.

Next, the functional configuration of the information processing apparatus 100 according to this embodiment is described with reference to FIG. 5. With FIG. 5, control performed by the CPU 101 is particularly described. To describe the functional configuration of the information processing apparatus 100 shown in FIG. 5, FIGS. 6 to 10 are referred to, as necessary. FIG. 5 is a block diagram illustrating the functional configuration of the information processing apparatus 100 according to this embodiment. A display screen 122 is an example of the above-described display unit 104, and a touch panel 120 is an example of the above-described input unit 105.

As illustrated in FIG. 5, the information processing apparatus 100 has a detector 112, a determination unit 114, a display controller 116, an operation controller 118, and the like. The detector 112 has a function of detecting the approach area of the operation body. As described above, when the operation body approaches the display screen 122, the capacitances detected by the touch panel 120 increase. The detector 112 detects the approach of the operation body to the display screen 122 when the capacitances detected by the touch panel 120 are in a predetermined range of values. The detector 112 then informs the determination unit 114 of the approach of the operation body.

The determination unit 114 determines whether or not the operation body detected by the detector 112 approaches a first region of the display screen 122. The first region is, for example, a region of the display screen 122 in which a selection operation using the touch panel 120 is difficult to perform due to a reason such as selection targets being displayed close to each other. The determination unit 114 also determines whether or not a predetermined period of time has elapsed since the operation body approached the first region of the display screen 122. That is, the determination unit 114 determines whether or not the operation body approached the display screen and, if so, whether or not the operation body has remained close to the display screen for the predetermined period of time. The determination unit 114 then provides the display controller 116 with results of the determination as to whether or not the operation body approached the display screen and whether or not the predetermined period of time has elapsed since that.

The display controller 116 has a function of displaying display content included in the first region in a second region that is different from the first region when the operation body is determined by the determination unit 114 to be approaching the first region. The second region is located outside the region approached by the operation body and inside the display area of the display screen 122. As described above, the display controller 116 displays the display content included in the first region in the second region that is different from the first region, so that a certain offset is provided between the operation body and operation targets. Display of the display content included in the first region in the second region that is different from the first region is also referred to as offset display in the description hereinafter.

The operation controller 118 has a function of regarding the operation of the operation body performed in the first region as the operation performed for display content displayed in the second region. As described above, the display content included in the first region is displayed in the second region through the offset display by the display controller 116. The operation controller 118 regards the operation of the operation body as the operation performed for the region subjected to the offset display. The display controller 116 may execute the focus display on selection items or the like displayed in the second region that are regarded by the operation controller 118 as being operated by the operation body.

Figure 6:
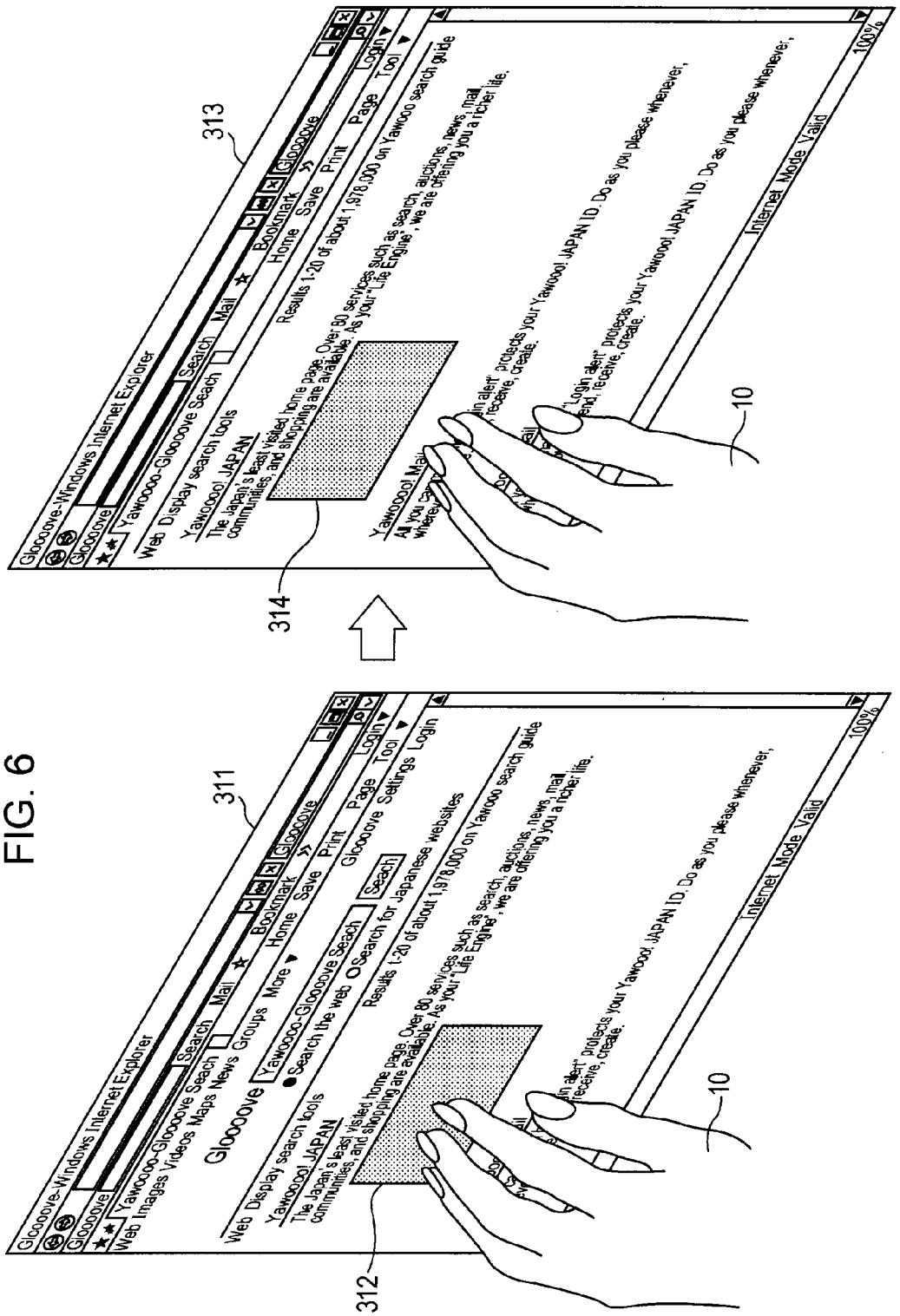
FIG. 6 is an explanatory diagram illustrating another display example according to the embodiment.

Now, the offset display is described with reference to FIGS. 6 and 7. Suppose that the operation body 10 approaches a region 312 (first region) in which selection targets are displayed close to each other as illustrated in FIG. 6. When the operation body 10 approaches the region 312 and remains close to the region 312 for more than the predetermined period of time, the display content included in the region 312 is shifted to a region 314 (second region). At this time, an entire display screen 311 may scroll upward to display the region 314 above the region 312.

In addition, the region 314 is a region that does not overlap the region 312 and is inside a display screen 313. The operation performed in a region in which the operation body 10 is located is accepted by the operation controller 118 as the operation performed for the display content displayed in the region 314. Therefore, the user can operate the display content displayed in the region 314 through the offset display by operating the operation body 10 remaining in the region 312.

In addition, as illustrated in FIG. 7, when a region 322 approached by the operation body 10 is located in an upper portion of a display screen 321, display content in the region 322 may be displayed on the right or left through the offset display so as not to overlap the operation body 10. Since the region 322 (first region) approached by the operation body 10 is located in the upper portion of the display screen 321, the display controller 116 displays the display content included in the region 322 on the right in a region 324 of a display screen 323.

In FIGS. 6 and 7, a target corresponding to the position of the operation body 10 before the offset display may be subjected to the focus display. In doing so, the user can recognize where his/her finger or hand is located in a region subjected to the offset display. As illustrated in FIGS. 6 and 7, even when there is a region of the display screen in which selection items are displayed closed to each other, the user can select a selection item in the region while seeing the region. In addition, because display content on the display screen does not change largely even when the display with a certain offset provided is performed, the user can easily select an operation target displayed close to other operation targets while utilizing the display area. Therefore, the operability of the touch panel can be improved while the amount of information displayed on the display screen remains the same.

When the approach of the operation body 10 to the display screen is no longer detected after the offset display, the offset display ends. In doing so, the operation targets can be temporarily subjected to the offset display, which can prevent the user from being stressed by a problem in that, for example, the user has to press a back button due to unintended switching of the display screen. The offset display also ends when one of the operation targets is selected with the operation body 10 after the offset display. In doing so, smooth switching of the display screen can be realized without adding an extra operation step, thereby improving the operability of the touch panel.

Figure 8:
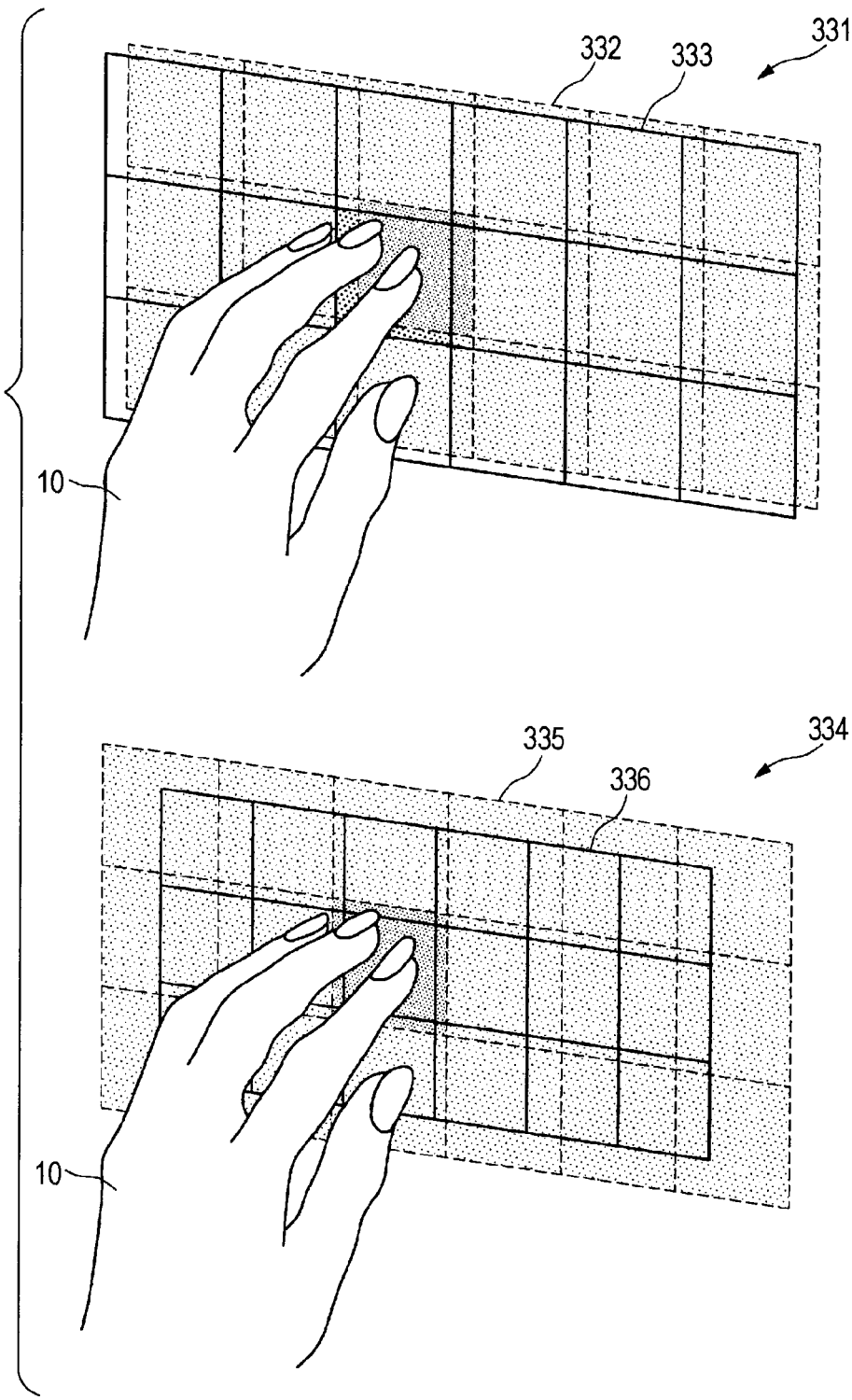
FIG. 8 is an explanatory diagram illustrating a selection operation when gain is added to the amount of movement according to the embodiment.

In addition, the operation controller 118 may add gain to the amount of movement of the operation body 10 after the offset display for a selection operation in which selection items are selected. For example, operation load can be reduced by increasing the amount of movement of the selection items for the selection operation relative to the amount of movement of the operation body 10. The selection operation when gain is added to the amount of movement is described hereinafter with reference to FIG. 8. FIG. 8 is an explanatory diagram illustrating the selection operation when gain is added to the amount of movement.

In FIG. 8, a display example 331 illustrates the usual relationship between approach coordinates 333 and a display area 332. A display example 334 illustrates the relationship between approach coordinates 336 and a display area 335 when gain is added to the amount of movement. In the display example 331, the display area 332 and the approach coordinates 333 have the same size. Therefore, the amount of movement the operation body 10 makes on the touch panel is equal to the amount of movement of the operation targets in the corresponding display area.

On the other hand, in the display example 334, since the gain is added to the amount of movement, the amount of movement of the operation targets in the corresponding display area is larger than the amount of movement of the operation body 10. Therefore, an operation target such as a selection item included in the corresponding display area can be selected with an amount of movement of the operation body 10 smaller than usual.

For example, when a portion in which the operation body 10 is virtually located is subjected to the focus display after the offset display as described above, the amount of movement of the focus is configured to be large relative to the amount of movement of the operation body 10. More specifically, the amount of movement of the focus on the display screen corresponds to the sum of the amount of movement of the operation body 10 from a reference position, which is a position in which the operation body 10 has remained close to the display screen, and the added gain. The amount of gain may be changed in accordance with how closely the operation targets are arranged. By configuring the amount of movement of the focus to be large relative to the amount of movement of the operation body 10, the operation load can be further reduced.

Next, the display position of the display area in the display screen after the offset display and the amount of gain are described with reference to FIG. 9. FIG. 9 is an explanatory diagram illustrating a display example after the offset display. Suppose that the operation body 10 approaches a region 352 in which selection items are displayed close to each other in the display content displayed on a display screen 351. In that case, as illustrated in a display screen 353, the display screen 351 moves upward so that the display content displayed in the region 352 is displayed in a region 354.

Furthermore, when gain is added to the amount of movement of the operation body 10, the user can operate the display content displayed in the region 354 just by moving the operation body 10 within a region 356. The display position of the region 354 after the offset display herein is configured to be such a position that the operation body 10 does not overlap the region 354 even if all the targets included in the region 354 are selected by the operation body 10. In addition, when the gain is added to the amount of movement of the operation body 10, the distance between the targets in the region 356 is configured to be as short as possible, so long as humans can operate the targets. Thus, an appropriate display position of the operation targets and an appropriate amount of gain can be provided after the offset display.

Figure 10:
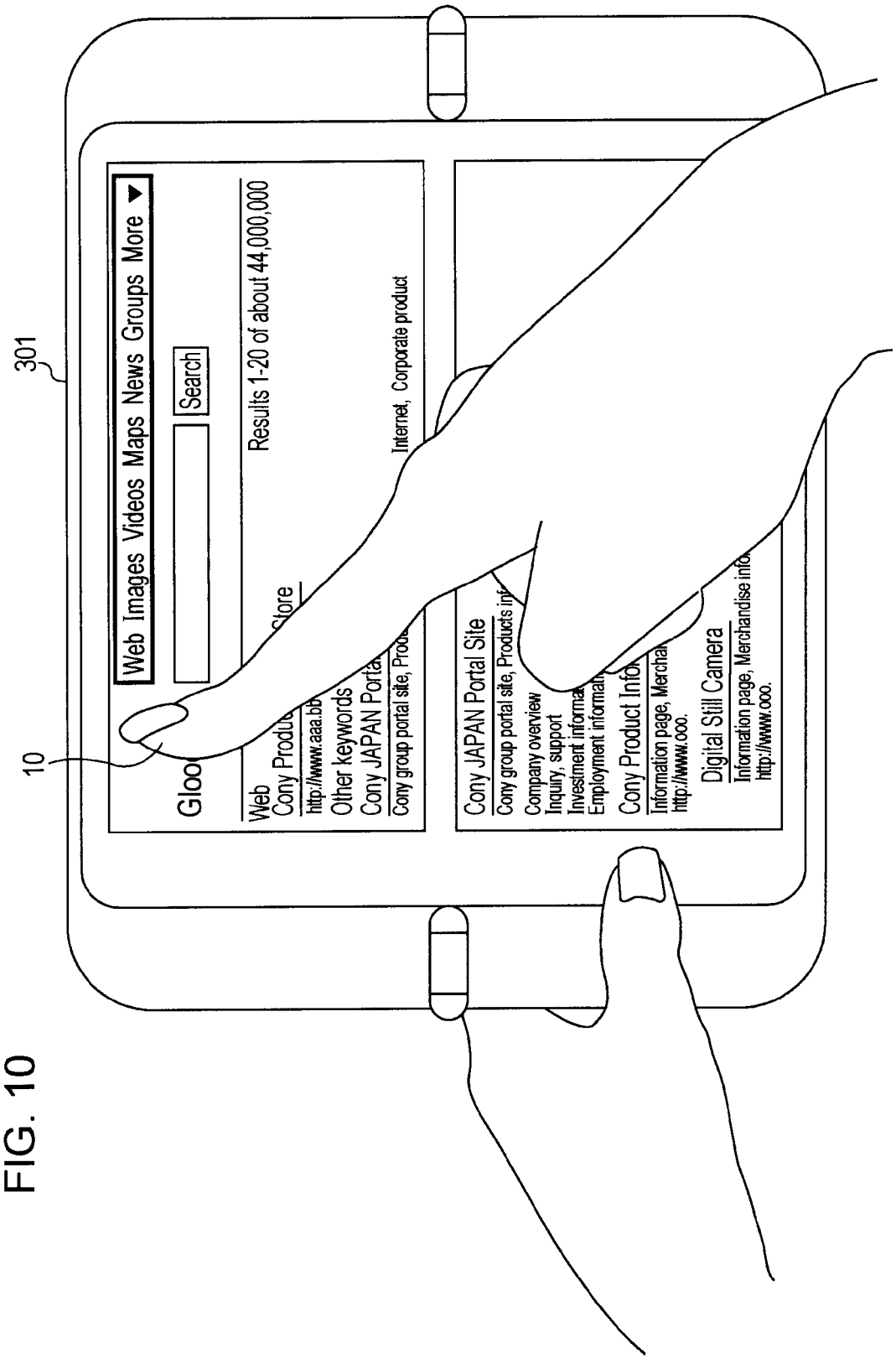
FIG. 10 is an explanatory diagram illustrating another display example according to the embodiment.

Although a case in which operation targets are subjected to the offset display has been described above, the present invention is not limited to this example. Display content of the operation targets may be enlarged and displayed in a region different from a region in which the operation body 10 is located. For example, as illustrated in FIG. 10, the display content in a region selected by the operation body 10 may be enlarged and displayed at such a position that the operation body 10 does not overlap the display content.

(4) Details of Operation of Information Processing Apparatus

Figure 11:
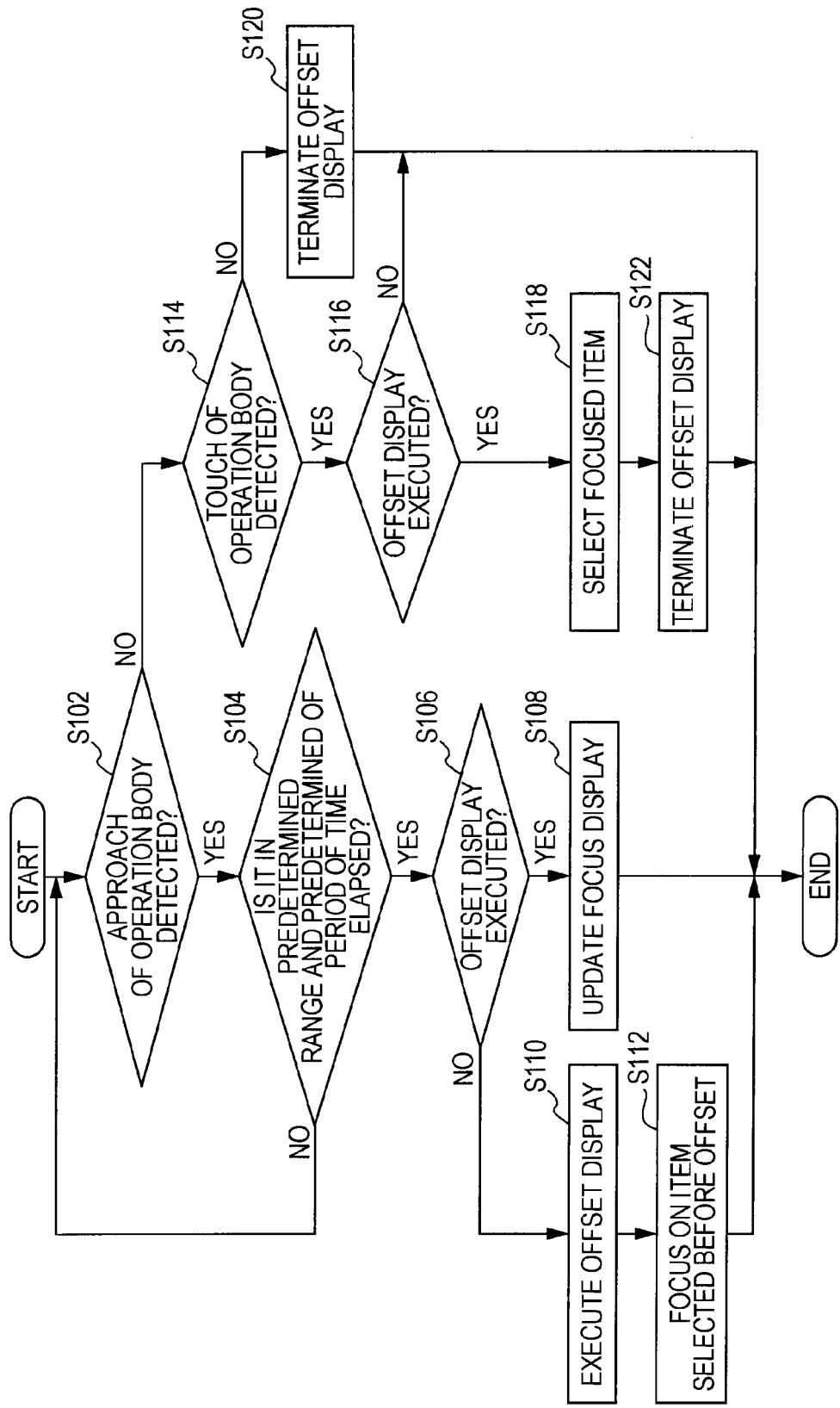
FIG. 11 is a flowchart illustrating the details of the operation of the information processing apparatus according to the embodiment.

The functional configuration of the information processing apparatus 100 has been described. Next, the details of the operation of the information processing apparatus 100 are described with reference to FIG. 11. FIG. 11 is a flowchart illustrating the details of the operation of the information processing apparatus 100. First, as illustrated in FIG. 11, the detector 112 detects whether or not an operation body approaches the display screen 122 (S102). In step S102, the detection as to whether or not the operation body approaches the display screen 122 is accomplished by determining whether or not the amount of change in the capacitances detected by the touch panel 120 is more than a predetermined value.

If the approach of the operation body is detected by the detector 112 in step S102, the determination unit 114 determines whether or not the operation body is located in a predetermined area of the display screen and, if so, whether or not a predetermined period of time has elapsed under that condition (S104). If the approach of the operation body is not detected in step S102, processing after step S114 is performed. The processing after step S114 will be described later.

If it is determined in step S104 that the operation body is in the predetermined area of the display screen and that the predetermined period of time has elapsed under that condition, a further determination as to whether or not the offset display has been executed is made (S106). If it is determined in step S104 that the operation body is not in the predetermined area of the display screen or that the predetermined period of time has not elapsed, the processing returns to step S102. If it is determined in step S106 that the offset display has been executed, the focus display is updated (S108). If the offset display has been executed, one of the selection items in a region that is subjected to the offset display has already been subjected to the focus display. In that case, in step S108, the focus display is moved from the selection item subjected to the focus display to another selection item on which the operation body is virtually located.

If it is determined in step S106 that the offset display has not been executed, the offset display is executed (S110). In step S110, the display controller 116 moves display content displayed in a region selected by the operation body to a region different from the selected region in order to realize the offset display. A target selected by the operation body before the offset display is executed is then subjected to the focus display (S112).

Back in step S102, if an approach of the operation body is not detected, it is determined whether or not a touch of the operation body is detected (S114). If it is determined in step S114 that the touch of the operation body is detected, a further determination as to whether or not the offset display has been executed is made (S116). If it is determined in step S114 that the touch of the operation body is not detected, the offset display terminates (S120).

If it is determined in step S116 that the offset display has been executed, an item subjected to the focus display is selected (S118). After the item subjected to the focus display is selected in step S118, the offset display terminates (S122). If it is determined in step S116 that the offset display has not been executed, the processing ends.

As described above, when an operation body approaches a display screen, the region approached by the operation body is subjected to the offset display. When a touch of the operation body is detected while the offset display is executed, a touched item in the region subjected to the offset display is selected. Thus, smooth switching of the display screen can be realized without adding an extra operation step such as pressing a back button to display the previous screen due to unintended selection of a wrong operation target, thereby improving the operability of the touch panel.

The preferred embodiments of the present invention have been described in detail with reference to the accompanying drawings; however, the present invention is not limited to these examples. It is to be understood that a person having ordinary knowledge about the technical field of the present invention can arrive at various modifications and changes without departing from the technical ideas described in the claims, and such modifications and changes may fall within the technical scope of the present invention.

For example, steps of the processing performed by the information processing apparatus 100 in this specification are not necessarily performed in the chronological order as illustrated in the flowchart. That is, the steps of the processing performed by the information processing apparatus 100 may be performed in parallel even if the steps are included in different processes.

Furthermore, a computer program that enables hardware incorporated in the information processing apparatus 100 or the like, such as a CPU, a read-only memory (ROM), and an RAM to perform functions equivalent to that of each component of the information processing apparatus 100 can be created. In addition, a storage medium storing the computer program can also be provided.

The present application contains subject matter related to that disclosed in Japanese Priority Patent Application JP 2009-295585 filed in the Japan Patent Office on Dec. 25, 2009, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a detector configured to detect an operation body approaching a display screen;
a determination unit configured to determine whether or not the operation body detected by the detector approaches a first region of the display screen;
a display controller configured to display display content included in the first region in a second region that is different from the first region when the operation body is determined by the determination unit to be approaching the first region; and
an operation controller configured to regard an operation performed by the operation body in the first region as an operation for the display content displayed in the second region by the display controller,
wherein the display controller displays the display content in the second region by offsetting a display of the display screen by a predetermined distance so as to shift the display content from a location of the first region to a location of the second region.

2. The information processing apparatus according to claim 1, wherein the display controller displays the display content included in the first region in the second region that is separated from a region approached by the operation body by a predetermined distance.

3. The information processing apparatus according to claim 1, wherein the determination unit determines whether or not the operation body that has approached the first region of the display screen remains close to the first region for a predetermined period of time, and
wherein the display controller displays the display content included in the first region in the second region that is different from the first region when the operation body that has approached the first region is determined by the determination unit as remaining close to the first region for the predetermined period of time.

4. The information processing apparatus according to claim 1, wherein the display controller defines the second region as a region that is outside a region approached by the operation body and inside a display area of the display screen.

5. The information processing apparatus according to claim 1, wherein the display controller executes focus display on the second region in which the display content included in the first region is displayed.

6. The information processing apparatus according to claim 5, wherein, when a plurality of selection items are included in the display content displayed in the second region, the display controller executes the focus display on a selection item selected in the operation for the display content displayed in the second region, the operation for the display content displayed in the second region being obtained by using the operation controller.

7. The information processing apparatus according to claim 1, wherein the display controller enlarges the display content included in the first region and displays the enlarged display content in the second region.

8. The information processing apparatus according to claim 1, wherein the operation controller obtains the operation for the display content displayed in the second region by adding gain to an amount of movement of the operation body in the first region.

9. The information processing apparatus according to claim 8, wherein the operation controller changes the gain to be added to the amount of movement of the operation body in accordance with a display density of the display content displayed in the second region.

10. The information processing apparatus according to claim 1, wherein when the display controller offsets the display, a whole image of the display screen is shifted by the predetermined distance.

11. The information processing apparatus according to claim 1, wherein selection of a selection item found within the display content is made when the operation body makes contact with the display screen after the display controller offsets the display.

12. The information processing apparatus according to claim 11, wherein the operation body makes contact with the display screen after the display controller offsets the display.

13. The information processing apparatus according to claim 1, wherein a selection target within the display content, corresponding to a position of the operation body prior to the display being offset, is subjected to a focus display within the second region.

14. The information processing apparatus according to claim 1, wherein the display controller offsets the display as the operation body approaches the display screen, and a selection is made of a selection item found within the display content when the operation body makes contact with the display screen after the display controller offsets the display.

15. The information processing apparatus according to claim 1, wherein the determination unit determines that the operation body is approaching the first region prior to a contact with the display screen by the operation body.

16. The information processing apparatus according to claim 1, wherein the first region contains a plurality of selection targets located in close proximity.

17. An information processing method comprising the steps of:
   detecting an operation body approaching a display screen;
   determining whether or not the operation body that has been detected approaches a first region of the display screen;
   displaying display content included in the first region in a second region that is different from the first region when the operation body is determined to be approaching the first region; and
   regarding an operation performed by the operation body in the first region as an operation for the display content displayed in the second region,
   wherein the display content is displayed in the second region by offsetting a display of the display screen by a predetermined distance so as to shift the display content from a location of the first region to a location of the second region.

18. A non-transitory computer-readable medium having embodied thereon a program, which when executed by a computer, causes the computer to perform an information processing method, the method comprising:
   detecting an operation body approaching a display screen;
   determining whether or not the operation body that has been detected approaches a first region of the display screen;
   displaying display content included in the first region in a second region that is different from the first region when the operation body is determined to be approaching the first region; and
   regarding an operation performed by the operation body in the first region as an operation for the display content displayed in the second region,
   wherein the display content is displayed in the second region by offsetting a display of the display screen by a predetermined distance so as to shift the display content from a location of the first region to a location of the second region.

19. An information processing apparatus comprising:
   a detector configured to detect an operation body approaching a display screen;
   a determination unit configured to determine whether or not the operation body detected by the detector approaches a first region of the display screen;
   a display controller configured to display display content included in the first region in a second region that is different from the first region when the operation body is determined by the determination unit to be approaching the first region; and
   an operation controller configured to regard an operation performed by the operation body in the first region as an operation for the display content displayed in the second region by the display controller,
   wherein the display controller displays the display content in the second region by scrolling a substantially entire content of the display screen by a predetermined distance so as to offset the display content from a location of the first region to a location of the second region.

* * * * *